United States Patent [19]

Mann

[11] 4,319,453
[45] Mar. 16, 1982

[54] DIESEL EXHAUST PARTICULATE AND ORGANIC VAPOR EMISSION CONTROL

[75] Inventor: Gamdur S. Mann, Flint, Mich.

[73] Assignee: General Motors Corporation, Detroit, Mich.

[21] Appl. No.: 119,144

[22] Filed: Feb. 6, 1980

[51] Int. Cl.³ .............................................. F01N 3/02
[52] U.S. Cl. ...................................... 60/309; 55/217; 55/267; 55/314; 55/350; 55/418; 60/311
[58] Field of Search ............... 60/309, 311, 288, 297; 55/217, 267, 314, 350, 418, DIG. 30; 422/169

[56] References Cited

U.S. PATENT DOCUMENTS

| | | | |
|---|---|---|---|
| 3,100,146 | 8/1963 | Huntington | 60/309 |
| 3,282,046 | 11/1966 | Walker | 60/297 |
| 3,645,098 | 2/1972 | Templin | 60/288 |
| 3,657,892 | 4/1972 | Perga | 60/287 |
| 3,782,115 | 1/1974 | Johnson | 55/267 |
| 3,831,377 | 8/1974 | Morin | 60/309 |
| 4,217,757 | 8/1980 | Crone | 60/297 |

FOREIGN PATENT DOCUMENTS 2845928  5/1979  Fed. Rep. of Germany ........ 60/297

*Primary Examiner*—Douglas Hart
*Attorney, Agent, or Firm*—Robert J. Outland

[57] ABSTRACT

A system for controlling emissions of particulates and heavy organic vapors in the exhaust gases of diesel engines includes, in a preferred embodiment, a heat exchanger for cooling the engine exhaust gases below the condensation temperature of the organic vapors and their resultant adsorption onto the entrained particulates, and a particulate trap connected to receive the cooled gases from the heat exchanger and collect therefrom entrained particulates and heavy organic vapors adsorbed thereon. A bypass system is provided to direct high temperature exhaust gases around the filtration device to avoid desorption of condensed vapors from the collected particulates and other auxiliary filter and control means are included.

4 Claims, 1 Drawing Figure

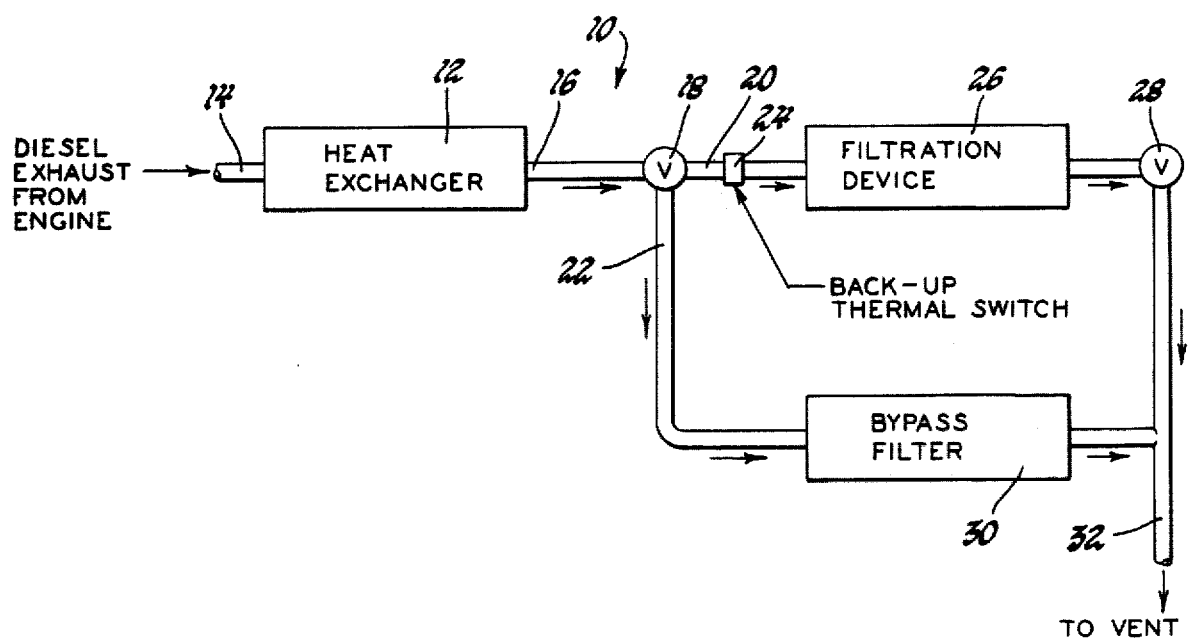

4,319,453

DIESEL EXHAUST PARTICULATE AND ORGANIC VAPOR EMISSION CONTROL

TECHNICAL FIELD

This invention relates to diesel engine exhaust emission control and, more particularly, to systems for removing particulates and heavy organic vapors from diesel engine exhaust gases.

BACKGROUND

Concurrent with the recent and anticipated future increase in the use of diesel engine powered passenger automobiles in the United States has come an increasing interest in the development of practical methods for limiting particulate and other emissions in diesel exhaust gases to levels that will avoid any adverse environmental effects. In this connection work is underway both in the area of engine modifications and add-on devices to control diesel exhaust emissions. At the same time, efforts are in process in both government and industry to learn more about diesel engine exhaust emissions and their possible environmental effects to aid in establishing rational standards for their control.

SUMMARY

The present invention relates to a diesel engine exhaust filtration system that is operative to remove from diesel exhaust gases both particulates entrained therein as well as certain heavy organic vapors that are condensable above normal ambient temperatures. The invention provides a modified exhaust system which includes an exhaust particulate filter or trap capable of removing particulates from diesel engine exhaust gases conducted therethrough. In addition, the system of the invention provides a heat exchanger connected ahead of the filter or trap device to cool the engine exhaust gases to a moderate temperature range within which the heavy organic vapors are largely condensed and adsorbed onto the carbonaceous particulates.

The invention further provides bypass means for carrying exhaust gases around the filtration device when the temperature exceeds the desired level to avoid desorbing organic vapors from the collected particulates. A second filter in the bypass passage may be provided to collect particulates in the exhaust gases during bypass operation.

The system takes advantage of the ability of the carbonaceous diesel exhaust particulates to adsorb the condensate of heavy organic vapors, such as hydrocarbons and partially burned products entrained in the exhaust stream. The heat exchanger normally cools the gases to condense these organic vapors, which are then able to be adsorbed and collected with the particulates in the filtration device. The bypass system diverts exhaust gases not sufficiently cooled to enter the filtration device and thus prevents the subsequent loss of collected vapors through overheating of the filter. Further the low temperature of operation of the main filter permits its construction from a low temperature resistant material, such as cellulose fiber or other paper materials. Various alternative modes of construction and alternative materials may, of course, be used.

These and other features and advantages of the invention will be more fully appreciated from the following description of a preferred embodiment taken together with the accompanying drawing.

BRIEF DRAWING DESCRIPTION

The single FIGURE of the drawing is a schematic view illustrating the arrangement of a preferred embodiment of diesel engine exhaust filtration system formed in accordance with the invention.

BEST MODE DISCLOSURE

Referring now to the drawing in detail, numeral 10 generally indicates a diesel engine exhaust emission control system formed in accordance with the principles of the invention. System 10 includes a heat exchanger 12 in which exhaust gases are brought into heat exchange relation with ambient air or another suitable cooling fluid, not shown. The heat exchanger 12 includes an inlet 14 connectable with the exhaust gas outlet of a diesel engine and connected internally of the heat exchanger with an outlet 16 for carrying the cooled exhaust gases from the heat exchanger.

Outlet 16 is connected with a bypass valve 18 that directs the exhaust gas flow either into a main flow line 20 or a bypass line 22. The main flow line includes in series a thermal switch 24, a particulate trap preferably in the form of a filter or filtration device 26 and a flame arrester valve 28. The bypass line 22 preferably includes a bypass filter 30. Both lines 20 and 22 are preferably joined at their outlets with an exhaust pipe 32 leading to the exhaust system outlet.

The heat exchanger 12 is designed to normally cool the diesel engine exhaust gases supplied thereto down to a temperature at which most of the heavy organic vapors in the exhaust gases that are condensable above ambient temperature will be condensed and allowed to be adsorbed onto the carbonaceous particulates that are entrained in substantial volume within the exhaust gases. Preferably the heat exchanger will cool the exhaust gases down to a temperature range at, or slightly below, 150° F. with some subsequent cooling taking place in the system downstream of the heat exchanger. It is believed desirable that the normal wall temperature in the heat exchanger be maintained in excess of about 120° F. to avoid significant condensation of water vapor on the cooler walls.

Any suitable form of heat exchanger may be used. However, it is presently considered preferable to provide an air-to-air heat exchanger, having fins or other heat exchange encouraging devices on the diesel engine exhaust conduit, so as to utilize the cooling effect of ambient air to draw the heat out of the exhaust gases and provide the desired cooling.

The bypass valve 18 is responsive to temperature to direct the exhaust gases into the bypass line whenever the temperature of the exhaust gases leaving the heat exchanger exceeds a predetermined temperature, such as 150° F. Under normal operating conditions, if the heat exchanger is properly designed, the gas temperature will be below the predetermined FIGURE and the valve 18 will direct the exhaust gases through the main flow line 20 to the filtration device 26. The valve 18 additionally functions as a pressure relief to bypass exhaust flow into the bypass line 22 at any time in which the gas pressure ahead of the filtration device exceeds a predetermined value which might result in damage to the filter therein.

The thermal switch 24 is provided as a safety device to protect the filter element of the filtration device 26 against excessive temperature. If the temperature responsive bypass valve fails to bypass the exhaust gases at a high enough temperature, the thermal switch 24 cuts off flow through the main flow line causing a pressure increase that requires the bypass valve to open and bypass the flow into the bypass line.

The filtration device 26 may comprise any suitable form of exhaust particulate filter or trap capable of collecting a substantial portion of carbonaceous exhaust particulates present in diesel exhaust gases. Since the operating temperatures in the main flow line 20 will be well below 250° F., and are prevented from rising above that temperature by the bypass valve 18 as well as by the protective thermal switch 24, it is possible to use a relatively low temperature resistant filter material in the filter element provided for the filtration device 26. Thus, it is contemplated that the filter element used in the device may be a pleated paper element or other material capable of operating at temperatures of up to about 250° F. The filter housing and the filter element may be constructed in a manner to permit easy servicing of the filtration device by the removal of a filter element filled with particulates and replacement of a new clean filter element in its place. With proper construction in a manner similar to known filter devices, the filled paper element may be made destructible by burning for easy disposal of the used filter and the collected particulates therein.

The flame arrester valve 28 is optionally includable in the system as a second safety device to close off the main flow line if, due to the malfunction of other devices therein or for any other reason, combustion should occur within the housing of the filtration device during engine operation. In such a case, the heat of combustion leaving the filtration device will cause flame arrester valve 28 to close, blocking the flow of air through the filter and stopping further burning while exhaust gases will again be bypassed by the bypass valve 18 through the bypass line 22.

In all cases, gases passing through the bypass line are preferably filtered by a bypass filter 30 which will collect at least a large portion of particulates passing therethrough so as to prevent their escape to atmosphere. The bypass filter may be constructed of any suitable material which is capable of withstanding the highest temperatures expected to be present in the engine exhaust gases under all operating conditions.

In operation, exhaust gases from the associated diesel engine, not shown, are passed into the heat exchanger 12 through the inlet 14 where they are cooled by heat exchange with ambient air or other coolant to a temperature preferably in the range of between about 120° and 150° F. Cooling of the exhaust gas to this level condenses out a large portion of the heavy organic vapors, such as unburned hydrocarbons and partial combustion products, and allows the condensate to be adsorbed onto the carbonaceous particulates that are entrained in the exhaust gas.

Subsequently, the cooled exhaust gas is directed through the bypass valve 18 into the main exhaust line, passing into the filtration device 26. Here a large portion of the particulates containing condensed organic vapors are collected and retained while the cleaned exhaust gas passes out through the valve 28 to the exhaust pipe 32.

If under any engine operating condition the heat exchanger should be unable to reduce the exhaust temperature to a predetermined figure such as 150° F., the bypass valve 18 will direct the gases into the bypass line 22 where they are filtered by the bypass filter 30 and passed onto the exhaust pipe 32. This prevents the higher exhaust gas temperatures from heating the filtration device to an excessive temperature which might cause desorption and revaporization of some of the organic vapors, which would then pass with the cleaned exhaust gases out of the exhaust system to atmosphere.

It is, of course, anticipated that the heat exchanger will be so designed as not to permit the temperature of exhaust gas delivered to the bypass valve 18 to exceed the predetermined bypass temperature under most engine operating conditions. Accordingly, the collection volume and serviceability of the bypass filter need not be as great as that of the filtration device 26 through which a major portion of the engine exhaust gases will normally pass.

With a diesel exhaust emission control system as described, the elimination of substantial portions of heavy organic vapors from the exhaust gases delivered to atmosphere is accomplished as a part of the process of separating and collecting the carbonaceous particulates known to be present in diesel engine exhaust gases.

While the invention has been described by reference to a specific form of exhaust emission control system chosen for purposes of illustration, it should be understood that numerous changes and variations could be made in the arrangement and construction of the system and its components without departing from the inventive concepts inherent in this disclosure. Accordingly, it is intended that the invention not be limited to the particular embodiment described but that it have the full scope permitted by the language of the following claims.

The embodiments of the invention in which an exclusive property or privilege is claimed are defined as follows:

1. A diesel engine exhaust filtration system operative to remove particulates and heavy organic vapors from exhaust gases, said system comprising heat exchange means connectable with a diesel engine to receive exhaust gases therefrom and operative to cool at least a major portion of said received exhaust gases to a temperature level at which a major portion of heavy organic vapors in the gases are condensed, thereby causing their adsorption onto the largely carbonaceous particulates entrained in diesel exhaust gases, filtration means comprising a filter element of relatively low temperature resistance connected with the heat exchange means to receive cooled exhaust gases therefrom and operative to filter out of the gases a substantial portion of the entrained particulates, whereby the condensed vapors adsorbed thereon are also removed, temperature responsive means to prevent excessive heating and revaporization of organic condensate retained in the filtration means, said temperature responsive means including bypass means around said filtration means and operative to divert past said filtration means exhaust gases retaining an excessive temperature level after passing through the heat exchanger, and means operative to block passage through said filtration means to exhaust gases having a temperature level higher than the temperature resistance level of said filter element.

2. The combination of claim 1 wherein said system further includes pressure responsive means to divert exhaust gases through said bypass means whenever a predetermined limiting pressure occurs in said filtration device.

3. A diesel engine exhaust filtration system operative to remove particulates and heavy organic vapors from exhaust gases, said system comprising heat exchange means connectable with a diesel engine to receive exhaust gases therefrom and operative to cool at least a major portion of said received exhaust gases to a temperature level at which a major portion of heavy organic vapors in the gases are condensed, thereby causing their adsorption onto the largely carbonaceous particulates entrained in diesel exhaust gases, filtration means connected with the heat exchange means to receive cooled exhaust gases therefrom and operative to filter out of the gases a substantial portion of the entrained particulates whereby the condensed vapors adsorbed thereon are also removed, and temperature responsive means to prevent excessive heating and revaporization of organic condensate retained in the filtration means, said temperature responsive means including bypass means around said filtration means and operative to divert past said filtration means exhaust gases retaining an excessive temperature level after passing through the heat exchanger.

4. The combination of either of claim 3 or 2 and further including supplemental filter means in said bypass means to collect particulates from the bypassed exhaust gases.

* * * * *